United States Patent
Gurner et al.

[11] Patent Number: 5,369,270
[45] Date of Patent: Nov. 29, 1994

[54] SIGNAL GENERATOR ACTIVATED BY RADIATION FROM A SCREEN-LIKE SPACE

[75] Inventors: Asaf Gurner, Tel-Aviv; Oded Y. Zur, Netanya, both of Israel

[73] Assignee: Interactive Light, Inc., Los Angeles, Calif.

[21] Appl. No.: 102,541

[22] Filed: Aug. 2, 1993

Related U.S. Application Data

[63] Continuation of Ser. No. 776,669, Oct. 15, 1991, abandoned.

[30] Foreign Application Priority Data

Oct. 15, 1990 [IL] Israel ........................... 095998

[51] Int. Cl.$^5$ ............................................. G01V 9/04
[52] U.S. Cl. ................................. 250/221; 340/556; 345/167
[58] Field of Search ........................ 250/221, 222.1; 340/555, 556, 557; 364/410, 709.02, 189; 345/167, 157, 145, 158; 84/639

[56] References Cited

U.S. PATENT DOCUMENTS

| | | |
|---|---|---|
| 3,805,061 | 4/1974 | De Missimy et al. |
| 4,429,607 | 2/1984 | Meno. |
| 4,479,053 | 10/1984 | Johnston. |
| 4,712,003 | 12/1987 | Ban et al. |
| 4,804,860 | 2/1989 | Ross et al. ............ 340/556 |
| 4,968,877 | 11/1990 | McAvinney et al. |
| 5,017,770 | 5/1991 | Sigalov ............ 250/221 |
| 5,045,687 | 9/1991 | Gurner ............ 250/221 |
| 5,059,959 | 10/1991 | Barry. |
| 5,081,896 | 7/1992 | Hiyoshi et al. |

FOREIGN PATENT DOCUMENTS

| | | |
|---|---|---|
| 0342347 | 11/1989 | European Pat. Off. |
| 3129841 | 7/1981 | Germany. |
| 3436703 | 10/1984 | Germany. |
| 2209169 | 8/1990 | Japan. |
| 272494 | 11/1990 | Japan. |
| 338694 | 2/1991 | Japan. |
| 4026432 | 1/1992 | Japan. |
| 8600605 | 4/1987 | WIPO. |

*Primary Examiner*—David C. Nelms
*Attorney, Agent, or Firm*—Kirschstein, Ottinger, Israel & Schiffmiller

[57] ABSTRACT

An apparatus for producing signals by means of radiation, for controlling musical instruments, image producing devices, video games, computer games and the like, comprises sensors sensitive to radiation directed towards them from points of sensing spaces, selectively to produce the aforesaid signals, and emitters for conveying radiation to elongated emission spaces.

24 Claims, 4 Drawing Sheets

SIGNAL GENERATOR ACTIVATED BY RADIATION FROM A SCREEN-LIKE SPACE

RELATED APPLICATIONS

This application is a file wrapper continuation application of U.S. Ser. No. 07/776,669, filed on Oct. 15, 1991, which is now abandoned.

BACKGROUND OF THE INVENTION

1. Field of The Invention

This invention relates to apparatus and processes for detecting objects, especially for operating musical instruments, video games and the like.

2. The Prior Art

Apparatus for operating musical instruments by radiation has been described in the prior art. One such apparatus is described in EPA 89304784.5, wherein it is also taught that the apparatus may be used to generate optical images and the like, in general with the aid of a microcomputer, to control game-playing devices.

SUMMARY OF THE INVENTION

This invention refers to apparatus in which radiation detectors, or sensors, are reactive to radiation from objects entering sensing beams associated with the detectors. An apparatus according to the invention comprises a sensing beam or screen, viz. a screen-like space which comprises the points such that radiation originating therefrom is detectable by a radiation detector or sensor. An array of screens can be arranged to form an enclosed inner space in which a person moves. The array may be continuous, or contiguous beams merging the ones into the others, or may be nearly continuous, the gaps between contiguous sensing beams being relatively minor in size, or may comprise overlapping sections, wherein contiguous sensing beams overlap. The sensing beams preferably have nearly rectangular or trapezoidal cross-sections. They are preferably slanted, with respect to the vertical, and if the screen is a closed one, they are slanted inwards toward the area in which the person operates, by an angle that is comprised between 0° and 10° and preferably between 3° and 7°. The sensors are activated by penetration of a radiation source or of a body which reflects or diffuses radiation coming from a source.

Each sensor generates an electrical signal corresponding to a musical tone, an image, a modification or motion of an image, a game-playing instruction, or an operating signal for controlling any device or interface. It is preferred that the emission and sensing beams overlap. The sensing beams may have different shapes in the vertical cross-section. In the simplest case they will have a flared-out or essentially triangular cross-section— more exactly, a trapezoidal cross-section which has a very short lower side. However, different shapes may be imparted to the sensing beams, if desired.

With the above considerations in mind, the apparatus according to the invention comprises radiation detectors or sensors responsive to radiation and means for conveying to said sensors radiation from elongated sensing spaces or beams.

The apparatus will ordinarily comprise a plurality of sensing beams, each associated with at least one sensor. The radiation that is conveyed to the sensor preferably originates from an emitter which is outside said beam and is reflected or diffused towards the sensor by a surface having reflective or diffusive capacities.

BRIEF DESCRIPTION OF THE DRAWINGS

The invention will be better understood from the description of a preferred embodiment thereof, with reference to the appended drawings wherein.

DETAILED DESCRIPTION OF THE PREFERRED EMBODIMENT

In the embodiment herein described, a sensing screen is considered without any reference to the way in which the radiation is produced, e.g. infrared or visible radiation or laser or ultrasound radiation, and so forth.

Figure 1:
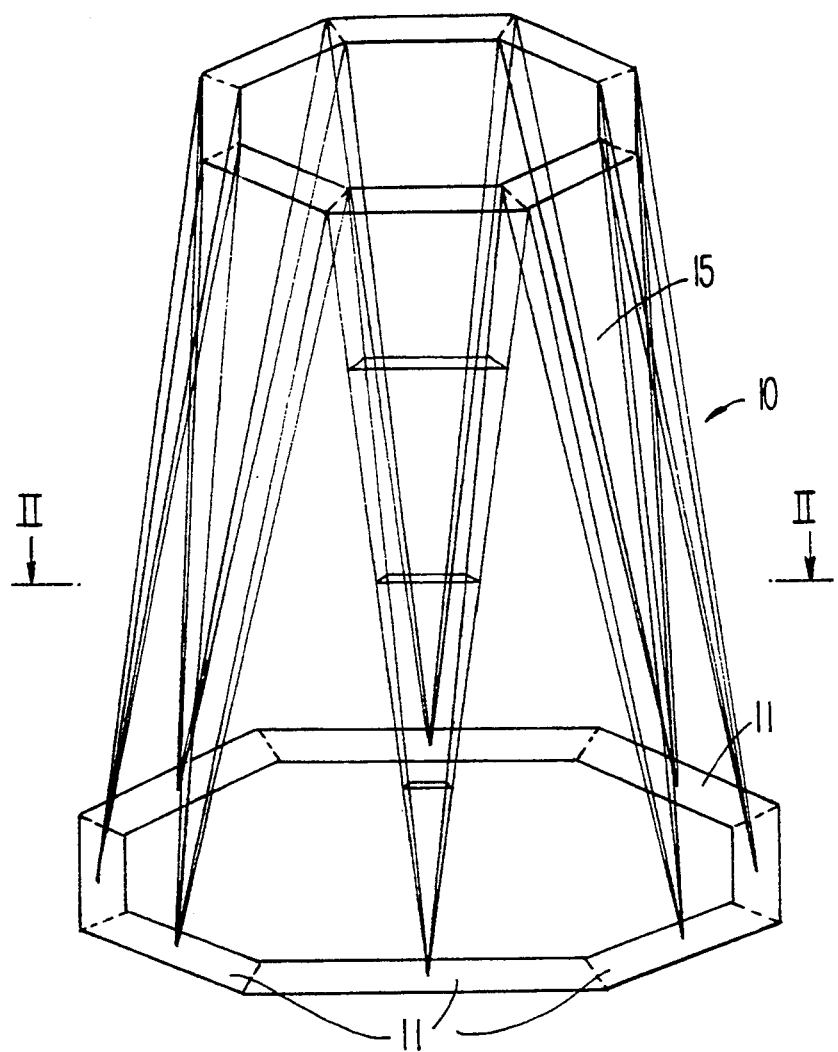
FIG. 1 is a perspective view of an apparatus according to an embodiment of the invention.

As seen in FIG. 1, an optical controller apparatus 10 according to this embodiment of the invention comprises a number of elongated panel sections 11 or supports arranged in a closed line, specifically, in the schematic embodiment illustrated, a polygon having eight sides. The apparatus can be constructed in a number of ways, and its sections may be foldable or disassemblable, etc.

Figure 2:
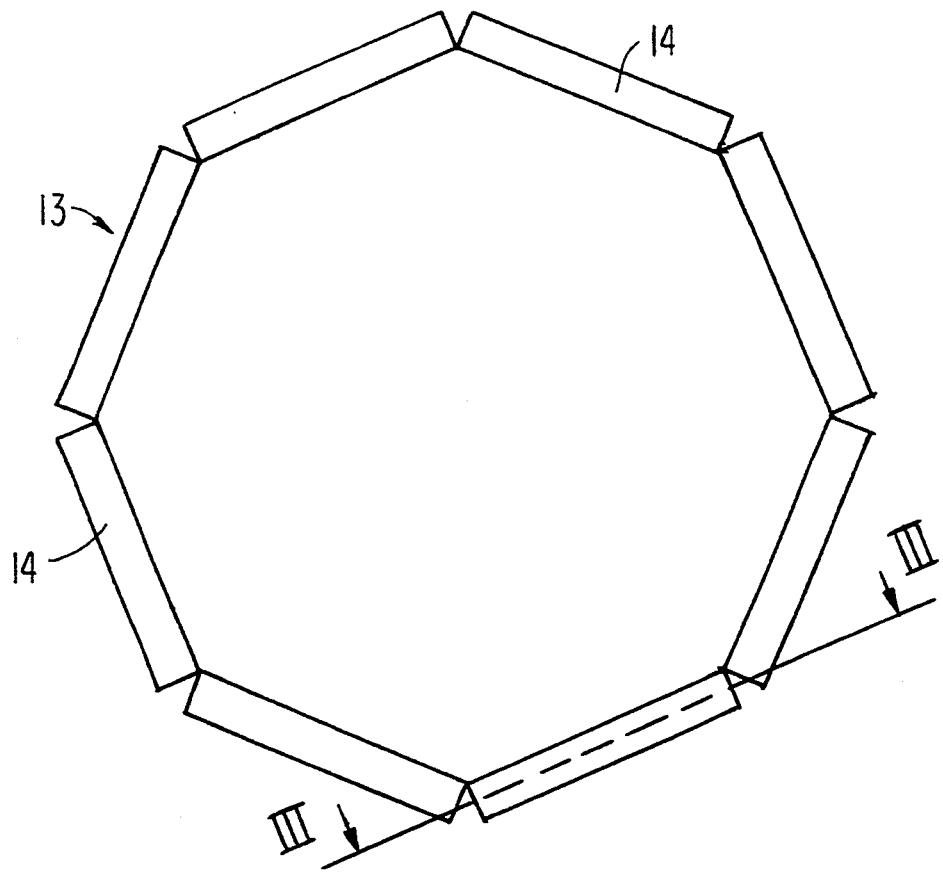
FIG. 2 is a sectional view of the sensing screen taken on line II—II of FIG. 1.

In FIG. 2, which is a horizontal cross-section of the sensing screen taken on plane II of FIG. 1, the sensing screen 13 is shown as being continuous, viz. the sensing spaces 14 border on one another, without the small gaps or the overlaps which, as has been said, could exist.

Figure 3:
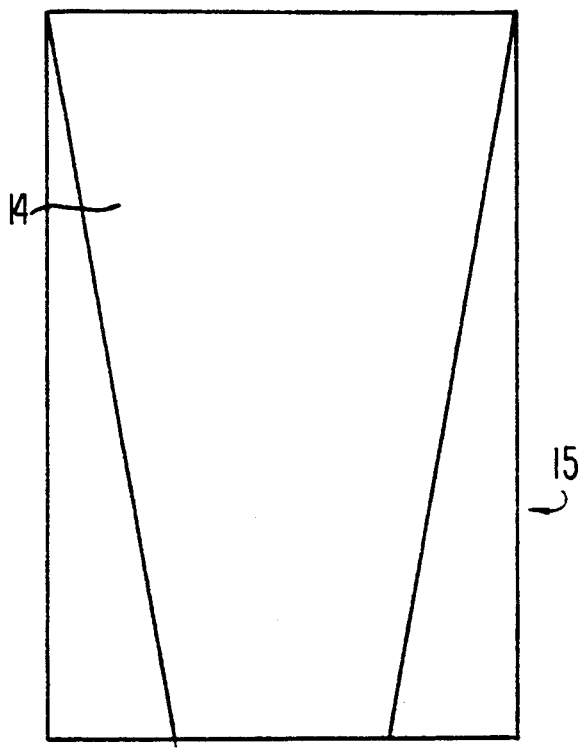
FIG. 3 is a vertical cross-section view of a sensing space, taken on any radial line, e.g. on line III—III of FIG. 2, showing the cross-section of a sensing space and of the parallelepiped which envelopes it.

FIG. 3 shows a sensing space 14 which is trapezoidal in vertical cross-section and a parallelepiped 15 which envelops it and has a rectangular cross-section. In this figure, the sensing space 14 is shown as constituting a single unit, which will ordinarily be associated with a given signal.

Figure 4:
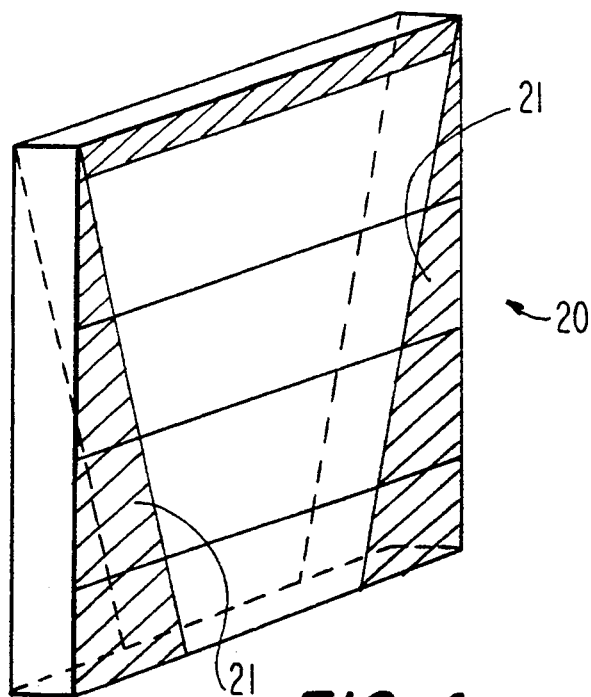
FIG. 4 schematically shows a parallellepipedal envelope which envelops a sensing space.

In FIG. 4 a parallelepiped 20 is represented in perspective view. The parallelepiped envelops the entire sensing screen 21. The sensing screen 21 is formed by overlapping portions of the sensing and emission beams. The parallelepiped 20 also includes inactive shaded areas outside the sensing screen, the areas shaded being formed by non-overlapping portions of the sensing and emission beams.

Figure 5:
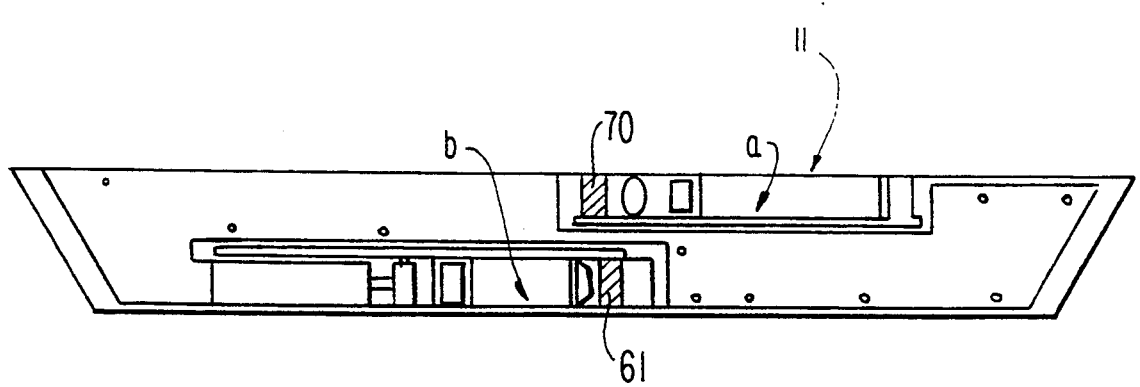
FIG. 5 shows a top plan view of a sensor and an emitter on a support.
Figure 6A:
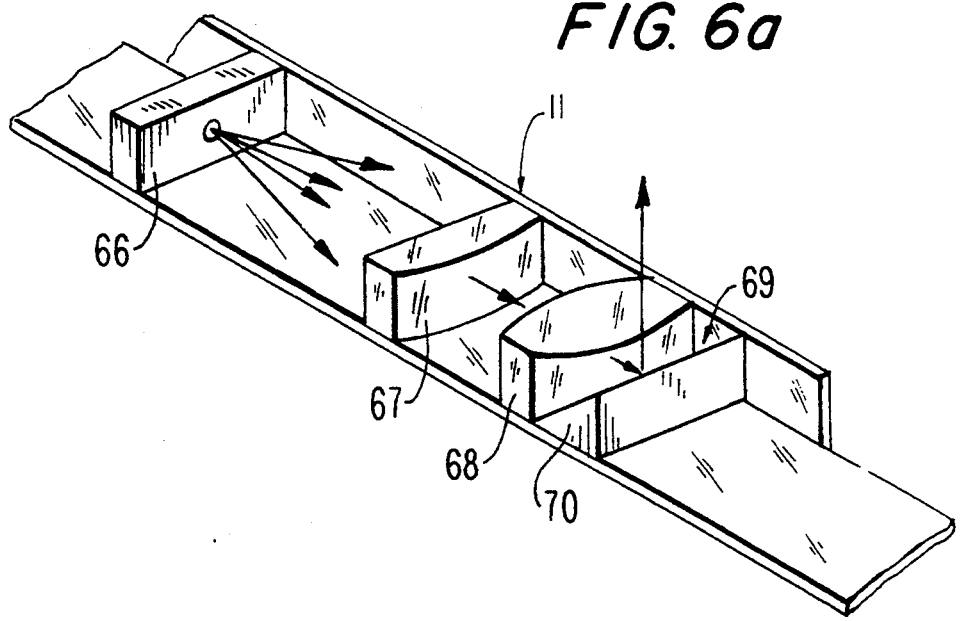
FIGS. 6a and 6b schematically show, in perspective view, an example of the emitter and the sensor of FIG. 5, with the top of the support removed for clarity.
Figure 6B:
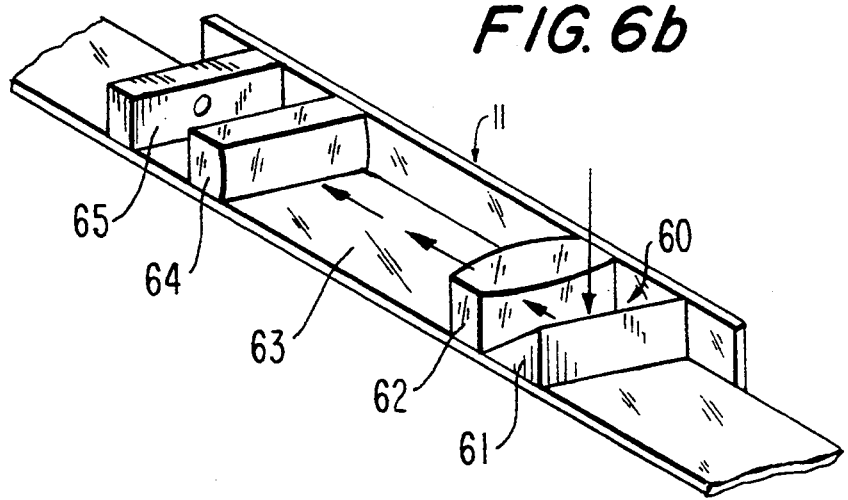

FIG. 5 is a general top view of a support for an apparatus according to one possible embodiment, the emitting means being indicated by (a), and the sensing means by (b). Correspondingly, FIG. 6(a) is a perspective view of emitting means (a) of FIG. 5, and FIG. 6(b) of sensing means (b) of FIG. 5. FIGS. 6(a) and 6(b) are shown with the top and one sidewall removed, for clarity. In FIG. 6(b) numeral 60 designates an opening or entrance port through which radiation is received by the sensor, viz., which constitutes the vertex of the sensing beam. 61 designates a mirror surface which reflects the incoming radiation by 90° to the spheric, 50 mm focal length shaping lens 62. Through lens 62 the radiation enters into radiation channel 63, which is provided with mirror surfaces (not shown). These mirror surfaces can be provided in any suitable way, e.g., by vaporizing an aluminum coating on the surface or glued mirror surface. Channel 63 ends with a cylindrical lens 64, which concentrates the radiation on the sensor component such as, e.g., a photodiode 65.

The combination of lenses 62 and 64, primarily cylindrical lens 64, are operative for shaping the sensing beam to have a generally thin, screen-like volume (see FIG. 4) in which the cross-sectional thickness is less than the cross-sectional width substantially throughout the beam.

Lens 62 is a spherical lens which has uniform magnification or focusing power in all directions in a two-dimensional cross-sectional plane perpendicular to its optical axis.

Lens 64 is a cylindrical lens which has magnification or focusing power in a single direction in a two-dimensional cross-sectional plane perpendicular to its optical axis. For example, cylindrical lens 64 as illustrated in FIG. 6(b) magnifies the beam only in the vertical direction at sensor 65. This being true, the field of view seen by sensor 65, through the combined power of lenses 62 and 64, is spread as illustrated by sensing space 14 in FIGS. 2-3 and 21 in FIG. 4. Mirror 60 merely changes the direction of the optical axis from vertical to longitudinal as shown in FIG. 6(b).

The channel 63 desirably has a height comprised between 7 mm and 9 mm and preferably between 7.8 mm and 8.2 mm, a width comprised between 24 mm and 28 mm and preferably between 24.8 mm and 25.2 mm, and a length comprised between 80 mm and 100 mm and preferably between 85 mm and 95 mm. This, of course, is only an example referring to a specific type of radiation, and a great variety of sensors and means for conveying radiation thereto could be used, both in the case of an optical radiation and in the case of other radiations, such as ultrasound etc.

The situation in FIG. 6(a) is similar but reversed, whereby radiation leaving a source 66 and passing through shaping lenses 67 and 68 leaves through an exit port or an opening 69 to shape an emission space.

It should be stressed once more that the invention relates to any apparatus of the kind described, provided that it comprises radiation detectors, which are sensitive to radiation of any kind directed towards them from points of a sensing space. In such apparatus, the invention can be carried into practice by persons skilled in the art with many modifications and adaptations and the use of many equivalents, without departing from its spirit or from the scope of the claims.

We claim: A detailed description of one embodiment of an individual panel section 11 can be seen in FIGS. 8 and 9. Each panel section 11 can have an emitting member (a) which can provide, for example, infrared radiation from a source 66. This radiation is subsequently shaped by optical lenses 67 and 68 and reflected upward by a reflector 70 through an opening 69. The emitted radiation extends into an elongated emission space above the panel section 11 and can be spread to a lesser degree in a radial direction, e.g., radially outward from the hexagonal embodiment of the optical controller 10, then in a lateral direction to provide a truncated emission space. The sensor member 6 is offset from the emitting member (a), but includes similar optical elements to provide a truncated sensing space, as disclosed in FIG. 3, to complement the emission space. The parallelpiped 15 corresponds to a projection of each panel section 11.

1. An apparatus for detecting an object, comprising:
   a) a support;
   b) emitter means supported by the support, and operative for transmitting radiation away from the support into an emission space;
   c) sensor means supported by the support and having a sensing space, said sensor means being operative for receiving radiation directed by an object located in the sensing space to the sensor means, and for generating an electrical signal indicative of the presence of the object in the sensing space;
   d) at least one of said sensor means and said emitter means including means for shaping at least one of said spaces to have a generally thin, screen-like volume having a cross-sectional width and a cross-sectional thickness less than said width substantially throughout said volume; and
   e) said at least one of said spaces lying substantially entirely within the other of said spaces.

2. The apparatus according to claim 1, wherein the emitter means includes an elongated emitter channel, a light source mounted in the emitter channel and operative for emitting a light beam, a single exit port, and means for directing the light beam emitted by the light source along the emitter channel and through the exit port along an outgoing path away from the support.

3. The apparatus according to claim 2, wherein the light beam emitted by the light source is non-visible to the human eye.

4. The apparatus according to claim 2, wherein the sensor means includes an elongated sensor channel, an entrance port, a light detector mounted in the sensor channel, and means for directing light entering the entrance port along a return path from the object along the sensor channel to the light detector.

5. The apparatus according to claim 4, wherein the support, the emitter channel and the sensor channel each extend generally linearly along a longitudinal direction, and wherein the exit and entrance ports are spaced apart of each other on the support in a transverse direction generally perpendicular to the longitudinal direction.

6. The apparatus according to claim 1, wherein the support is a single elongated section on which both the emitter means and the sensor means are mounted adjacent each other.

7. The apparatus according to claim 1, wherein the shaping means includes a shaping element in the sensor means for configuring the screen-like volume to converge as a generally flat, wide radiation beam along a return path to the support.

8. The apparatus according to claim 1, wherein the support extends along a longitudinal plane, and wherein the screen-like volume has a generally trapezoidal cross-section in planes both generally parallel, and generally perpendicular, to said longitudinal plane.

9. The apparatus according to claim 1, wherein the support extends along a generally horizontal plane, and wherein the screen-like volume generally extends along an inclined plane bounding an angle of inclination of about 0° to about 10° with respect to a vertical plane normal to said horizontal plane.

10. The apparatus according to claim 1, wherein the emitter means includes a single exit port through which the radiation is transmitted, and wherein the sensor means includes an entrance port through which at least a portion of the transmitted radiation passes.

11. An apparatus for detecting an object, comprising:
   a) a support;
   b) emitter means supported by the support, and operative for transmitting radiation through a single exit port away from the support into an emission space;
   c) sensor means supported by the support and having a sensing space, said sensor means being operative for receiving radiation directed by an object located in the sensing space to the sensor means, and for generating an electrical signal indicative of the presence of the object in the sensing space; and
   d) at least one of said sensor means and said emitter means including means for shaping at least one of said spaces to have a generally thin, screen-like volume having a cross-sectional width and a cross-sectional thickness less than said width substantially throughout said volume.

12. The apparatus according to claim 11, wherein said at least one of said spaces lies substantially entirely within said other of the spaces.

13. The apparatus according to claim 11, wherein the emitter means includes a single light source.

14. An apparatus for detecting an object, comprising:
   a support having a plurality of sections arranged in a substantially closed configuration;
   each section having an emitter means for transmitting radiation through a single exit port away from a respective section into an emission space, and a sensor means having a sensing space, and being operative for receiving radiation directed by an object located in the sensing space to the sensor means of the respective section;
   each sensor means being operative for generating an electrical signal indicative of the presence of the object in a respective sensing space; and
   at least one of said emitter means and said sensor means of a respective section including means for shaping at least one of said respective spaces to have a generally thin, screen-like volume having a cross-sectional width and a cross-sectional thickness less than said width substantially throughout said volume, all of the screen-like volumes extending along the substantially closed configuration.

15. The apparatus according to claim 14, wherein each emitter means includes an elongated emitter channel, a single light source mounted in the emitter channel and operative for emitting a light beam, means for directing the light beam emitted by the light source along the emitter channel and through the exit port.

16. The apparatus according to claim 15, wherein the light beam emitted by each light source is non-visible to the human eye.

17. The apparatus according to claim 15, wherein each sensor means includes an elongated sensor channel, an entrance port, a light detector mounted in the sensor channel, and means for directing light entering the entrance port along a return path from the object along the sensor channel to the light detector.

18. The apparatus according to claim 14, wherein each shaping means includes a shaping element in a respective sensor means for configuring the respective screen-like volume to converge as a generally flat, wide radiation beam along a return path to the respective section.

19. The apparatus according to claim 18, wherein the sections extend along a generally horizontal plane, and wherein each screen-like volume has a generally trapezoidal cross-section in planes both generally parallel, and generally perpendicular, to said horizontal plane.

20. The apparatus according to claim 14, wherein the sections extend along a generally horizontal plane, and wherein each screen-like volume extends generally along an inclined plane bounding an angle of inclination of about 0° to about 10° with respect to a vertical plane normal to said horizontal plane.

21. The apparatus according to claim 14, at least one of said spaces of each section lying substantially entirely within the other of said spaces of the respective section.

22. A method of detecting an object, comprising the steps of:
   a) transmitting radiation through a single exit port of an emitter on a support away from the support into an emission space;
   b) mounting a sensor having a sensing space on the support;
   c) receiving radiation directed by an object located in the sensing space to the sensor, and generating an electrical signal indicative of the presence of the object in the sensing space; and
   d) shaping at least one of said spaces to have a generally thin, screen-like volume having a cross-sectional width and a cross-sectional thickness less than said width substantially throughout said volume.

23. The method according to claim 22; and further comprising the step of positioning said at least one of said spaces substantially entirely within the other of said spaces.

24. The method according to claim 22, wherein the transmitting step is performed with a single light source.

* * * * *